US009064350B2

(12) United States Patent
Seah et al.

(10) Patent No.: US 9,064,350 B2
(45) Date of Patent: Jun. 23, 2015

(54) METHODS OF PROVIDING GRAPHICS DATA AND DISPLAYING

(75) Inventors: Hock Soon Seah, Singapore (SG); Feng Tian, Bournemouth (GB); Yixiang Lu, Singapore (SG); Jie Qiu, Singapore (SG); Quan Chen, Singapore (SG); Peng Lu, Singapore (SG)

(73) Assignee: Nanyang Technological University, Singapore (SG)

( * ) Notice: Subject to any disclaimer, the term of this patent is extended or adjusted under 35 U.S.C. 154(b) by 1033 days.

(21) Appl. No.: 12/669,382

(22) PCT Filed: Jul. 18, 2007

(86) PCT No.: PCT/SG2007/000212
§ 371 (c)(1),
(2), (4) Date: Mar. 25, 2010

(87) PCT Pub. No.: WO2009/011657
PCT Pub. Date: Jan. 22, 2009

(65) Prior Publication Data
US 2010/0194758 A1 Aug. 5, 2010

(51) Int. Cl.
*G06T 13/00* (2011.01)
*G09G 5/00* (2006.01)
(Continued)

(52) U.S. Cl.
CPC .............. *G06T 13/80* (2013.01); *G06T 2200/16* (2013.01); *G06T 2210/08* (2013.01); *G06T 9/00* (2013.01)

(58) Field of Classification Search
CPC .................. G06T 2207/10016; G06T 11/001; G06T 13/00; G06T 15/005; G06T 15/40; G06T 7/20; G06T 7/2206; G06T 7/2053; G06T 7/0071; G06T 11/00; G06T 15/08; G06T 2210/36; G06T 2210/44; G06T 7/0065; G06T 13/40; G06T 11/203; G06T 13/80; G06T 13/20; G09B 7/04; G06F 3/048; G06F 3/04845

USPC .......................................... 345/473–475, 441
See application file for complete search history.

(56) References Cited

U.S. PATENT DOCUMENTS 5,982,389 A    11/1999  Guenter et al.
7,034,849 B1 *  4/2006  Weybrew et al. ............. 345/629
(Continued)

FOREIGN PATENT DOCUMENTS

EP    0 762 776 B1    4/2004
JP    10-215458 A      8/1998
(Continued)

OTHER PUBLICATIONS

Japanese Patent Office, Office Action for Japanese Patent Application No. 2010-516952, dated Dec. 6, 2011.
(Continued)

*Primary Examiner* — Devona Faulk
*Assistant Examiner* — Nicole Gillespie
(74) *Attorney, Agent, or Firm* — Cahn & Samuels, LLP

(57) ABSTRACT

A method of providing graphics data, comprising generating a first set of data vectors specifying geometrical characteristics of a graphical object in a first digital picture, generating a second set of data vectors specifying geometrical characteristics of the graphical object in a second digital picture to be displayed after the first digital picture, generating a parameter set comprising information specifying intermediate geometrical characteristics of the graphical object based on the geometrical characteristics of the graphical object in the first digital picture, and of the graphical object in the second digital picture, wherein the intermediate geometrical characteristics are geometrical characteristics of the graphical object in at least one third digital picture to be displayed after the first digital picture and before the second digital picture, and generating at least one data file comprising the first set of data vectors, the second set of data vectors and the parameter set.

29 Claims, 14 Drawing Sheets

(51) Int. Cl.
*G06T 1/00* (2006.01)
*G06T 13/80* (2011.01)
*G06T 9/00* (2006.01)

(56) References Cited

U.S. PATENT DOCUMENTS

| | | | |
|---|---|---|---|
| 7,071,942 B2 * | 7/2006 | Zaima et al. | 345/473 |
| 7,898,542 B1 * | 3/2011 | Yu et al. | 345/473 |
| 2003/0164829 A1 * | 9/2003 | Bregler et al. | 345/474 |
| 2004/0004615 A1 * | 1/2004 | Hiraga et al. | 345/419 |
| 2004/0095999 A1 | 5/2004 | Piehl et al. | |
| 2005/0128201 A1 | 6/2005 | Warner et al. | |
| 2005/0151743 A1 * | 7/2005 | Sitrick | 345/473 |
| 2006/0129933 A1 | 6/2006 | Land et al. | |
| 2007/0025627 A1 | 2/2007 | Hasegawa et al. | |

FOREIGN PATENT DOCUMENTS

| | | | |
|---|---|---|---|
| JP | 2003099796 A * | 4/2003 | G06T 13/00 |
| JP | 2003099796 A * | 4/2003 | |
| JP | 2005190319 A | 7/2005 | |
| JP | 2007060619 A | 3/2007 | |

OTHER PUBLICATIONS

SIPO, Office Action for Chinese Patent Application No. 200780100669.6, dated Oct. 26, 2011.

Espacenet, English Abstract for JP2003099796.

Espacenet, English Abstract for JP2005190319.

Espacenet, English Abstract for JP2007060619.

European Patent Office, English abstract of JP 1021548 A, v3.espacenet.com, printed on Mar. 19, 2010.

Seah, Hock Soon, et al., "Artistic Brushstroke Representation and Animation with Disk B-Spline Curve", Proceedings of ACE 2005, Valencia, Spain, Jun. 2005.

* cited by examiner (a) Non-Vectorized Stroke    (b) Vectorized Stroke

| Fields | Comments |
|---|---|
| Stroke Type | |
| Color | Flat color (RGBA), gradient color, texture... (type dependent) |
| Point: position | The position of a control point |
| Point: radius | The radius of a control point |
| ... | Repeat above 2 fields (the remaining points that form the stroke |

Figure 6

| Fields | Comments |
|---|---|
| Shape Type | |
| Color | Flat color (RGBA), gradient color, texture... (type dependent) |
| Shape Dependent Data | |

Figure 7

| Circle Data | |
| --- | --- |
| Fields | Comments |
| Shape Type | = CIRCLE |
| Center Position | |
| Radius | |

| Rectangle Data | |
| --- | --- |
| Fields | Comments |
| Shape Type | = RECTANGLE |
| Position | |
| Width | |
| Height | |

| Polygon Data | |
| --- | --- |
| Fields | Comments |
| Shape Type | = POLYGON |
| Number of Points | |
| Point Position | |
| ... | Repeat "Point Position" field for the remaining points |

Figure 8

| Fields | Comments |
| --- | --- |
| Color Type | |
| Position | |
| Color | Flat color (RGBA), gradient color, texture... (type dependent) |

Figure 9

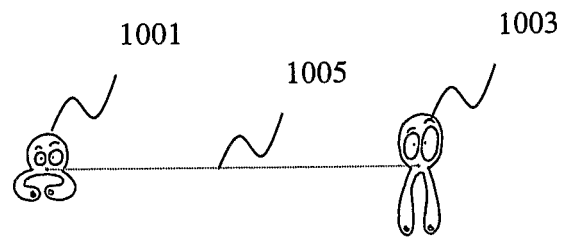
(a)
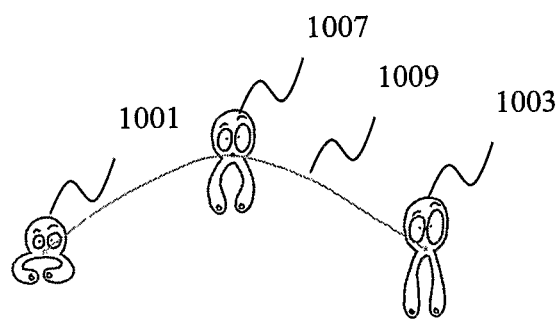
(b)
Figure 10

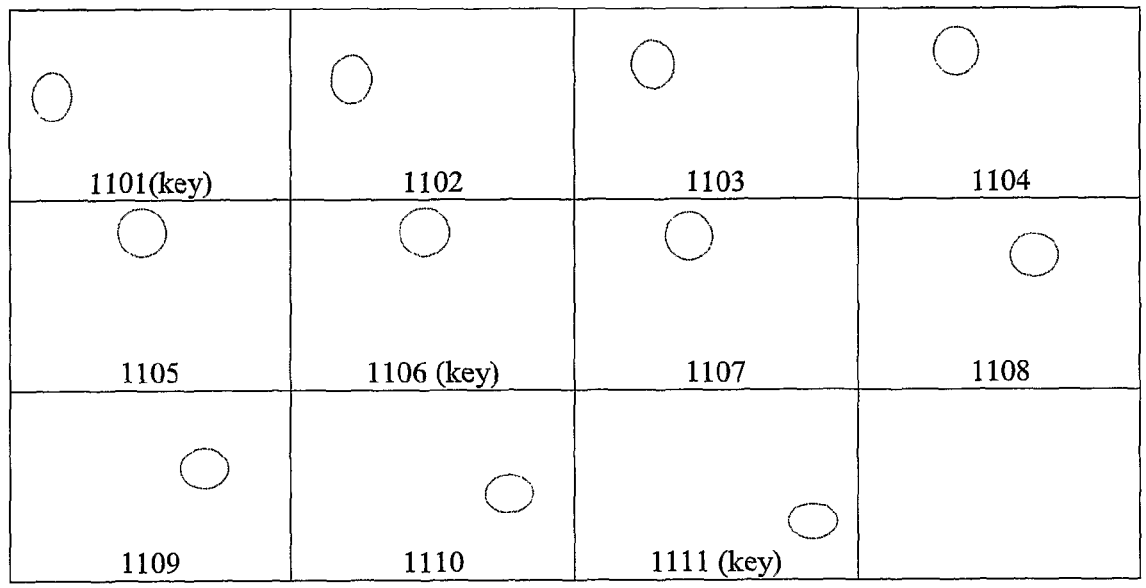
(a)
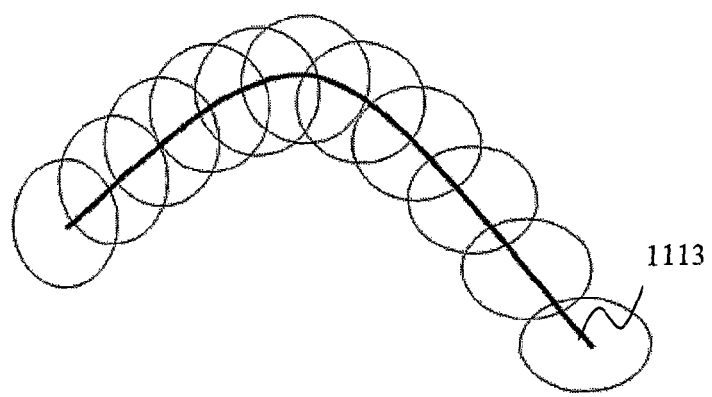
1113
(b)
Figure 11

|  | Key Frame 1 | Inbetween | Inbetween | Inbetween | Key Frame 2 |
|---|---|---|---|---|---|
| Frame | | | | | |
| Layer 1 | | | | | |
| Layer 2 | | | | | |
| Layer 3 | | | | | |
| Layer 4 | | | | | |
| Hidden Area Removed | | | | | |

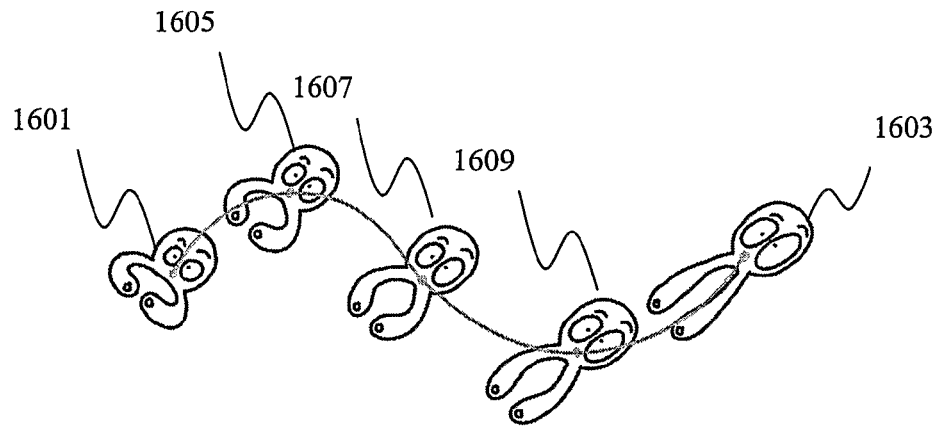
(a)
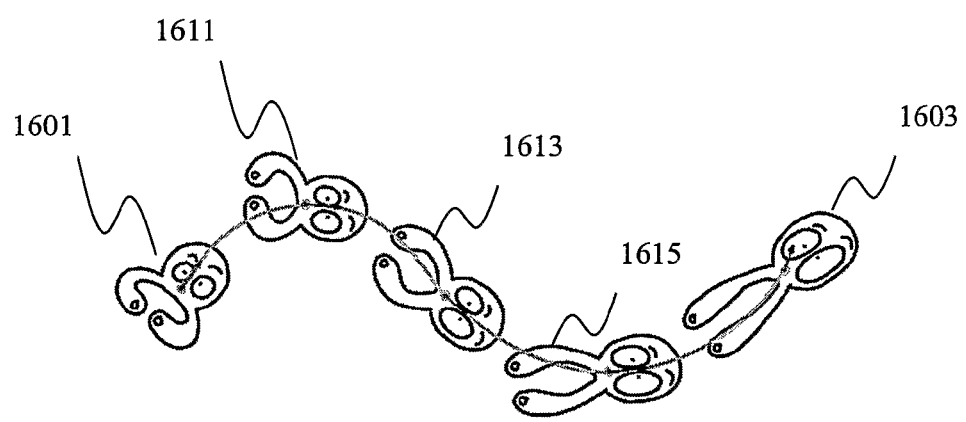
(b)
Figure 16

| Fields (Recurring) | Comments |
|---|---|
| Audio Channel ID | The ID of the first audio channel |
| Data Size | Size of the data of all clips in this channel |
| Audio Clip Data | The data of the first audio clip in this channel |
| ... | The data of other audio clips in this channel |
| Audio Channel ID | The ID of the second audio channel |
| Data Size | Size of the data of all clips in this channel |
| ... | |
| ... | The data of other audio channels |

Figure 20

| Fields | Comments |
|---|---|
| Audio Clip ID (File) | The ID of the audio clip determined by the adding order |
| Audio Clip Size | Size of the following data for this clip |
| Audio Starting Timing | Time for starting audio |
| Audio Ending Timing | Time for ending audio |
| Audio Data | |
| Audio Effect ID (optional) | The ID of the selected audio effect |
| Audio Effect Parameters (optional) | Parameters based on the selected audio effect |

Figure 21

| Fields | Comments |
|---|---|
| Audio Clip Type | From audio library |
| Audio Library ID | The library ID |
| Audio Clip ID (Library) | The clip ID in the library |

Figure 22

METHODS OF PROVIDING GRAPHICS DATA AND DISPLAYING

This application is the National Stage of International Application No. PCT/SG2007/000212, filed on Jul. 18, 2007 and was published in the English language on Jan. 22, 2009. The entire contents of which are incorporated herein by reference for all purposes.

I. FIELD OF THE INVENTION

The present invention refers to methods of providing graphics data and displaying graphics data.

II. BACKGROUND OF THE INVENTION

Nowadays, due to the advent of the Internet, information, such as data, graphics, video or text, are easily transmitted and shared across devices operating on different platforms, for example, personal computers (PCs), notebook computers, personal digital assistants (PDAs) and mobile phones.

As these devices are designed for different applications, it is not surprising that these devices all have different requirements and limitations, such as size of the display, memory capacity, available processing power and power consumption.

Now, a number of these device limitations affect how information is presented.

For example, how to present, say, a photograph which fills a large display screen (say, of a desktop PC) on a relatively small display screen (say, of a mobile phone) without any visible loss in visual quality, is a problem, in view of such a large diversity of devices.

There are currently two commonly used methods of representing graphics, namely, the raster based representation and the vector based representation.

In the raster based representation, each pixel is defined separately, for example, as in a digital photograph. As such, raster based representations are typically used in representing digital photographic images. Examples of raster based representations include the Graphic Interchange Format (GIF) format and the Joint Photographic Experts Group (JPEG) format.

The GIF format only allows the use of 256 colors, which is often insufficient for high quality photographic images. Accordingly, the GIF format is rarely used for high quality photographic images (the JPEG format is typically used for this application). However, the GIF format has an advantage in that it employs a lossless data compression technique. Therefore, with the GIF format, it is possible to reduce the size of a digital image without any loss in visual quality.

In a vector based representation of a digital picture, lines are represented using mathematical formula are used to draw lines (for example, taking two points and draw a parabola between them), which are then interpreted at the receiving side to produce and display the graphic. Because of this, with vector based representations sharp graphics may be provided using smaller files compared to raster based representations. However, with vector based representations, the process of rendering and displaying complex graphics is slower due to the large amount of processing required.

Vector based representations are typically used for desktop PC, Internet and mobile applications. Examples of vector based representations include the Flash format and the Scalable Vector Graphics (SVG) format.

The Flash format means the format used by the Adobe Flash Player and a multimedia authoring application program used to create content for Internet applications, computer games and movies. The Adobe Flash Player is a client side application widely available in most Internet browsers, which supports both the raster and vector based graphics representations. The use of vector based graphics representation in Flash format files (or .swf files), in combination with some program code, allows the size of Flash format files to be smaller than equivalent bitmap files or video clip files.

The SVG format is an XML-based text file format. Like the Flash files, the size of the SVG format files is also relatively small, when compared to the raster based representation formats. Another advantage of the SVG format is its scalability, meaning that the client side limitations can be used to determine how the file is rendered or displayed, by controlling parameters such as resolution, transformation and so on.

In this regard, it is noted that the size of files obtained using the vector based representations is generally smaller than those obtained using the raster based representations. Additionally, in the context of file sharing and transmission, a smaller file size is advantageous in that the said file requires less bandwidth for its transmission across wired or wireless networks.

Despite the advantages of all the above discussed graphics representation formats, the size of files obtained using these formats may still be relatively large.

III. SUMMARY OF THE INVENTION

In a first aspect of the invention, a method of providing graphics data is provided. The method comprises generating a first set of data vectors specifying geometrical characteristics of a graphical object in a first digital picture, generating a second set of data vectors specifying geometrical characteristics of the graphical object in a second digital picture to be displayed after the first digital picture, generating a parameter set comprising information specifying intermediate geometrical characteristics of the graphical object based on the geometrical characteristics of the graphical object in the first digital picture and based on the geometrical characteristics of the graphical object in the second digital picture, wherein the intermediate geometrical characteristics are geometrical characteristics of the graphical object in at least one third digital picture which is to be displayed after the first digital picture and before the second digital picture, and generating at least one data file comprising the first set of data vectors, the second set of data vectors and the parameter set.

In a second aspect of the invention, a method of displaying graphics data is provided. The method comprises receiving a first set of data vectors specifying geometrical characteristics of a graphical object in a first digital picture, receiving a second set of data vectors specifying geometrical characteristics of the graphical object in a second digital picture to be displayed after the first digital picture, receiving a parameter set comprising information specifying intermediate geometrical characteristics of the graphical object based on the geometrical characteristics of the graphical object in the first digital picture and based on the geometrical characteristics of the graphical object in the second digital picture, wherein the intermediate geometrical characteristics are geometrical characteristics of the graphical object in at least one third digital picture which is to be displayed after the first digital picture and before the second digital picture, generating the first digital picture from the first set of data vectors, generating the second digital picture from the second set of data vectors, and generating the at least one third digital picture using the parameter set, the geometrical characteristics of the graphical object in the first digital picture and the geometrical characteristics of the graphical object in the second digital picture.

In a third aspect of the invention, a method of providing graphics data is provided. The method comprises generating a first set of data vectors specifying geometrical characteristics of a graphical object in a first digital picture, generating a parameter set comprising information specifying intermediate geometrical characteristics of the graphical object based on the geometrical characteristics of the graphical object in the first digital picture, wherein the intermediate geometrical characteristics are geometrical characteristics of the graphical object in at least one third digital picture which is to be displayed before or after the first digital picture, and generating at least one data file comprising the first set of data vectors and the parameter set.

In a fourth aspect of the invention, a method of displaying graphics data is provided. The method comprises receiving a first set of data vectors specifying geometrical characteristics of a graphical object in a first digital picture, receiving a parameter set comprising information specifying intermediate geometrical characteristics of the object based on the geometrical characteristics of the graphical object in the first digital picture, wherein the intermediate geometrical characteristics are geometrical characteristics of the graphical object in at least one third digital picture which is to be displayed before or after the first digital picture, generating the first digital picture from the first set of data vectors, and generating the at least one third digital picture using the parameter set and the geometrical characteristics of the graphical object in the first digital picture.

The embodiments which are described in the context of the method of providing graphics data are analogously valid for the method of displaying graphics data and the apparatus.

IV. BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows the representation of a stroke in the graphics file format according to an embodiment of the invention.

FIG. 7 shows the representation of a primitive shape in the graphics file format according to an embodiment of the invention.

FIG. 8 shows exemplary representations of a circle, a rectangle and a polygon as a primitive shape in the graphics file format according to an embodiment of the invention.

FIG. 9 shows the representation of a field color in the graphics file format according to an embodiment of the invention.

FIG. 10 shows an example of an embodiment of the invention, wherein a set of data vectors is used as a means of modifying the path of movement of the graphical object.

FIG. 11 shows a further example of an embodiment of the invention, wherein a set of data vectors is used as a means of modifying the path of movement of the graphical object.

FIG. 14 shows an example of animating a graphical object using layering according to an embodiment of the invention.

FIG. 16 shows another example of the effects of modifying the parameter set on the animation of a graphical object according to an embodiment of the invention.

FIG. 20 shows a method of representing audio data in the graphics file format according to an embodiment of the invention.

FIG. 21 shows a method of representing audio clip data in the graphics file format according to an embodiment of the invention.

FIG. 22 shows the representation of an index to an audio data library in the graphics file format according to an embodiment of the invention.

V. DETAILED DESCRIPTION OF THE INVENTION

Figure 1:
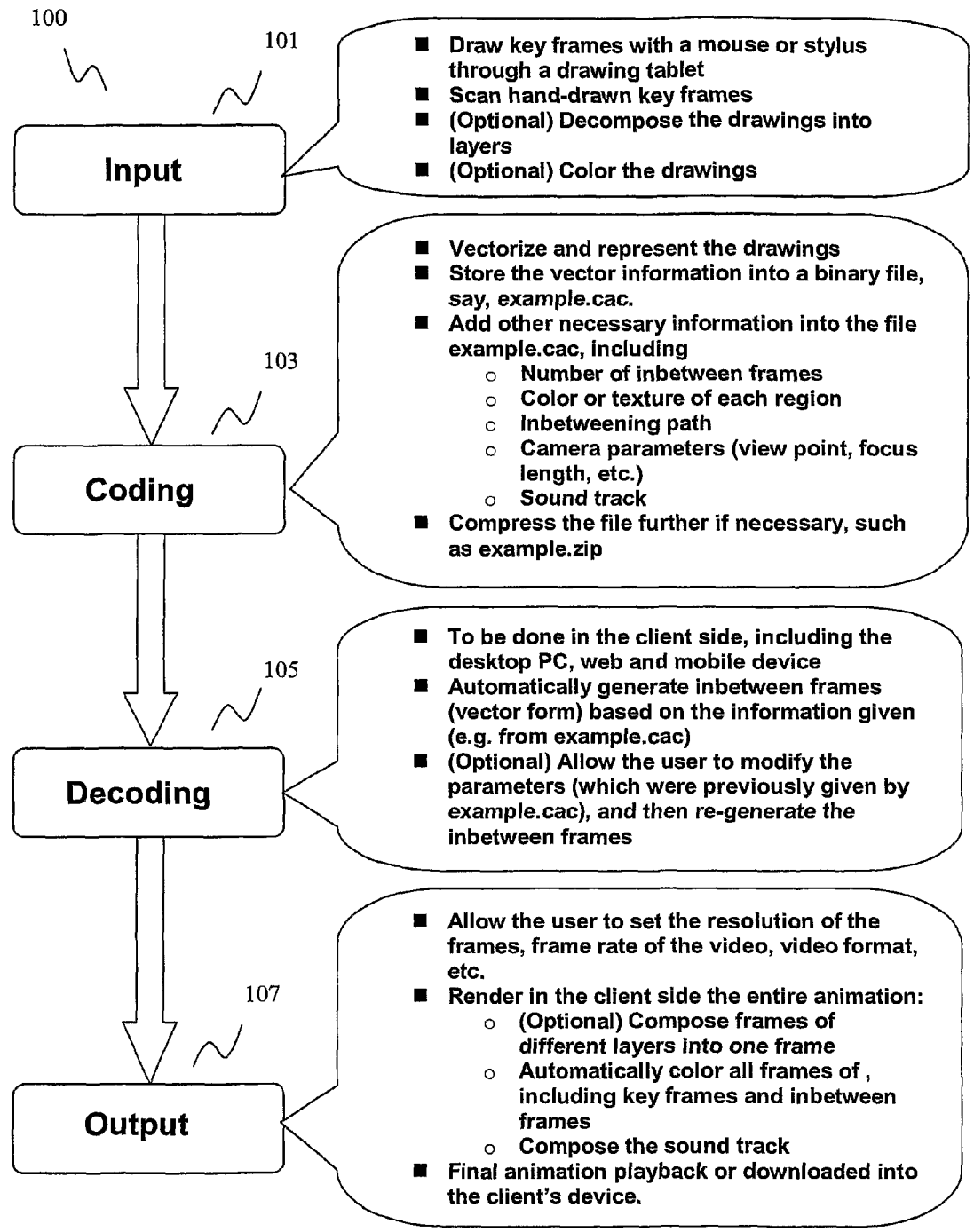
FIG. 1 shows a flow diagram describing briefly the steps of generating graphics data and displaying graphics data according to an embodiment of the invention.

Embodiments of the invention emerge from the dependent claims.

According to one embodiment of the invention, the method of providing graphics data provided further comprises generating a first set of data vectors specifying geometrical characteristics of a plurality of graphical objects in the first digital picture, and generating a second set of data vectors specifying geometrical characteristics of a plurality of graphical objects in the second digital picture to be displayed after the first digital picture.

As used herein, the term "plurality" refers to two or more items used together with the said term. For example, in this context, a plurality of graphical objects means two or more graphical objects.

In this embodiment, there may be more than one graphical object in the first digital picture. Accordingly, the first set of data vectors specifies the geometrical characteristics of all the graphical objects in the first picture.

Since there may be more than one graphical object in the first digital picture, there may also be more than one graphical object in the second digital picture. In view of this, the second set of data vectors may specify the geometrical characteristics of all the graphical objects in the second picture.

According to another embodiment of the invention, the parameter set further comprises information on the path of movement from the position of the graphical object in the first digital picture to the position of the graphical object in the second digital picture.

In this embodiment, it should be noted that the graphical object may be moved from one position in the first digital picture to another position in the second digital picture. For example, the path of movement for the graphical object may be, but is not limited to, a straight line, an arc or any line, from the position of the graphical object in the first digital picture to the position of the graphical object in the second digital picture.

In another embodiment, the path of movement may be specified or may take the value of a pre-defined default value.

In yet another embodiment of the invention, the parameter set further comprises information on the direction of the graphical object along the path of movement from its position in the first digital picture to its position in the second digital picture.

In this embodiment, when the graphical object moves along the path of movement, the direction of the graphical object may be fixed such that a noted point of the graphical object is always pointing to the north, for example.

Alternatively, the graphical object may be rotating in a clockwise manner as it moves along the path of movement, for example. In this case, the direction of the graphical object may be specified to be rotating in a clockwise manner.

In still another embodiment of the invention, the parameter set further comprises information on lighting effects.

As used herein, the term lighting effects refers to the effects of light on the graphical object as perceived from the digital picture. For example, when there is a light source on the left side of the graphical object, the left side of the graphical object would appear brighter than, say, the right side of the graphical object.

In another embodiment of the invention, the parameter set further comprises information on lighting effects, when the graphical object is a light source.

The parameter set may further comprise a third set of data vectors specifying geometrical characteristics of the graphical object in the fourth digital picture which is to be displayed after the first digital picture and before the second digital picture.

In this embodiment, the third set of data vectors (which is used to directly generate the fourth digital picture) may be used as another means of modifying the path of movement of the graphical object. For example, in the case where a default value for the path of movement is used, the inclusion of the third set of data vectors will automatically alter the path of movement, such that there is a smooth path of movement of the graphical object from its position in the first digital picture to its position in the fourth digital picture, and then to its position in the second digital picture.

According to one embodiment of the invention, the parameter set further comprises information on the number of third digital pictures which is to be displayed after the first digital picture and before the second digital picture.

In another embodiment of the invention, the parameter set further comprises information on the shape of the graphical object in the first digital picture, the second digital picture and/or the at least one third digital picture.

In this embodiment, the shape of graphical object may remain the same in the first digital picture, the second digital picture and/or the at least one third digital picture. Alternatively, the shape of graphical object may be specified, for example, to expand or contract (in one or more direction, for example), or even to change or morph into another shape.

In another embodiment of the invention, the information on the shape of the graphical object in the first digital picture, the second digital picture and/or the at least one third digital picture, further comprises information on the speed at which the shape of the graphical object changes from the first digital picture to the second digital picture.

In this embodiment, the information on the number of third digital pictures which is to be displayed after the first digital picture and before the second digital picture, and the information on the speed at which the shape of the graphical object changes from the first digital picture to the second digital picture, may be used to determine the rate of change for the shape of graphical object, as perceived by a user when the sequence of digital pictures (from the first digital picture to the second digital picture) is displayed.

In another embodiment of the invention, the parameter set further comprises information on the speed at which the position of the graphical object changes from the first digital picture to the second digital picture.

In this embodiment, for example, if the speed of position change of the graphical object is constant from the first digital picture frame to the second digital picture frame, the position difference of the graphical object between adjacent digital picture frames would be roughly the same.

According to one embodiment of the invention, the parameter set further comprises information on the camera parameters, such as the camera movement path, the camera rotation, the camera angle and the camera close up zooming effect.

According to another embodiment of the invention, the parameter set further comprises information on the layering of graphical objects, wherein the layering of graphical objects determines the order of appearance of the graphical objects.

As used herein, the term layering refers to the segmentation of part of a graphical object into different layers. In this regard, each layer may have part of the graphical object.

The term layering also refers to the segmentation of a group of graphical objects, where each layer may have one or more graphical objects.

For example, in computer graphics, layering is typically used to bring a group of graphical objects to the front or send a group of graphical objects to the back, for example. In this example, it is assumed that the first group of graphical objects is put into layer 1 and the second group of graphical objects is put into layer 2.

Now, in order to bring the first group of graphical objects to the front, the layers would be ordered such that layer 1 is displayed before layer 2. From the display point of view, the first group of graphical objects appears to be on top of the second group of graphical objects. As such, the view of portions of the second group of graphical objects would be blocked by the first group of graphical objects (if the first group of graphical objects is opaque).

Next, in order to send the first group of graphical objects to the back, the layers would be ordered such that layer 2 is displayed before layer 1. From the display point of view, the second group of graphical objects appears to be on top of the first group of graphical objects. As such, the view of portions of the first group of graphical objects would now be blocked by the second group of graphical objects (if the second group of graphical objects is opaque).

According to one embodiment of the invention, the parameter set further comprises information on the color of the graphical object and/or regions in the first digital picture, the second digital picture and/or the third digital picture.

As used herein, the term region refers to a group of graphical objects or an area within a border, which is defined by one or more vectors. An example of a region in the digital picture may be an area in the background scenery, such as a cloud or a hill, for example.

According to one embodiment of the invention, the parameter set further comprises information on the transparency of the graphical object in the first digital picture, the second digital picture and/or the third digital picture.

In this embodiment, the transparency of the graphical object may be specified to be opaque (transparency is 0%), fully transparent (transparency is 100%) or translucent (partially transparent), for example.

According to one embodiment of the invention, the at least one data file is a binary file.

According to one embodiment of the invention, the method of providing graphics data provided further comprises integrating audio data with the graphics data. In one embodiment, the at least one data file contains audio data. In another embodiment, the parameter set further comprising an index to an audio data file.

According to one embodiment of the invention, the method of providing graphics data provided further comprises using predetermined definitions of shapes of objects in order to reduce the size of the at least one data file. In one embodiment, the predetermined definitions of shapes of objects are stored in a library file.

According to one embodiment of the invention, the method of providing graphics data provided further comprises applying compression techniques on the at least one data file in order to reduce the size of the at least one data file.

According to one embodiment of the invention, the method of displaying graphics data provided further comprises arranging a sequence of digital pictures, wherein the arranged sequence of digital pictures is in the order that the first digital picture is followed by the at least one third digital picture which is itself followed by the second digital picture. In one embodiment, the method of displaying graphics data provided further comprises displaying the arranged sequence of digital pictures.

In another embodiment, the method of displaying graphics data provided further comprises receiving a first set of data vectors specifying geometrical characteristics of a plurality of graphical objects in the first digital picture, and receiving a second set of data vectors specifying geometrical characteristics of a plurality of graphical objects in the second digital picture to be displayed after the first digital picture.

According to one embodiment of the invention, the parameter set further comprises information on the path of movement from the position of the graphical object in the first digital picture to the position of the graphical object in the second digital picture.

According to one embodiment of the invention, the method of displaying graphics data provided further comprises arranging a sequence of digital pictures, wherein the sequence of digital pictures is in the order that the first digital picture is followed by the at least one third digital picture, or that first digital picture follows the at least one third digital picture. In one embodiment, the method of displaying graphics data provided further comprises displaying the sequence of digital pictures.

FIG. 1 shows a flow diagram 100 describing briefly the steps of generating graphics data and displaying graphics data according to an embodiment of the invention.

The steps of generating graphics data and displaying graphics data may be grouped into 4 categories, Input 101, Coding 103, Decoding 105 and Output 107, as shown in FIG. 1.

As mentioned under the Input category 101, the graphics data may be input directly into a computer, for example, by drawing the graphics on a computer terminal using a mouse or a stylus.

Alternatively, the graphics may be first hand-drawn onto a conventional drawing material (for example, a drawing canvas or a piece of paper). After which, the graphics is then scanned into a computer using a color scanner, for example.

In both cases, each digital picture frame of the graphics drawings consists of one or more graphical objects.

Another step which may be carried out under the Input category 101 is to decompose the graphical object(s) in each digital picture frame into layers. In this step, the graphical object(s) of each digital picture frame is segmented and then grouped into different layers. The purpose of this step is mainly to facilitate subsequent processing of the graphics, such as animation, for example. This step will be discussed in more detail in relation to FIG. 14 later.

Yet another step which may be carried out under the Input category 101 is to add color to each digital picture frame of the graphics drawings. This step may be carried out by adding a suitable value to the color parameter corresponding to a stroke or an area (or a region) in a digital picture frame. This step will be discussed in more detail in relation to FIG. 9 later.

As used herein, the term "key digital picture frame" refers to a digital picture frame which is manually input into the computer, using the methods of input described earlier, for example.

On the other hand, the term "non-key digital picture frame" refers to a digital picture frame which may be (automatically) generated on the computer (based on the key digital picture frame(s) and some parameters).

Under the Coding category 103, the first step mentioned in FIG. 1 is to vectorize and represent each key digital picture frame of the graphics drawings. In this step, a set of data vectors representing the graphical object(s) in a key digital picture frame is generated. In this regard, it should be noted that one set of data vectors is generated for one key digital picture frame.

The method of representing the graphical objects in a key digital picture frame as a set of data vectors will be discussed in more detail in relation to FIGS. 3 and 5 later.

The second step mentioned in FIG. 1 and which is carried out in coding is to store the vector information (or the set of data vectors) in a binary file. Since a binary file is used, there are file structures and file formats to be followed. The file structures and file formats will be discussed in more detail in relation to FIGS. 6-9 and 19-22 later.

The third step mentioned in FIG. 1 and which is carried out in coding is to add other necessary information into the binary file. The necessary information may include the path of movement, the number of digital picture frames to be generated along the path of movement (also referred to as the non-key digital picture frames or the inbetween frames), the color and/or texture of an area or a region in the digital picture, camera parameters (such as view point and focus length) and audio sound track. As described earlier in relation to embodiments of the invention, these necessary parameters are all included in the parameter set.

As mentioned earlier, a set of data vectors is generated for each key digital picture frame. Therefore, on the graphics display side, a key digital picture frame is generated from only the corresponding set of data vectors.

On the other hand, the non-key digital picture frames are generated based on the set(s) of data vectors and the parameter set. For this reason, the size of the graphics file generated may be relatively small, especially in cases where the number of non-key digital picture frames is large when compared to the number of key digital picture frames.

As a side note, the small size of the graphics file generated may be achieved at a cost of a higher processing/computing power requirement at the device where the graphics will be displayed.

As discussed earlier, in a preferred embodiment of the invention, two sets of data vectors and a parameter set are generated for a sequence of digital picture frames of the graphic drawings (which may be, for example, a graphics animation clip), wherein the first set of data vectors represents the first key digital picture frame and the second set of data vectors represents the second key digital picture frame. The parameter set may include, for example, information on the path of movement for a graphical object from its position in the first digital picture frame to its position in the second digital picture frame.

In this embodiment, if the parameter set does not include any information on the path of movement for a graphical object from its position in the first digital picture frame to its position in the second digital picture frame, a default value for the path of movement may be used, for example, a straight line path from the position of the graphical object in the first digital picture frame to its position in the second digital picture frame.

In an alternative embodiment of the invention, only one set of data vectors and a parameter set are generated for the sequence of graphic drawings. In this case, the first set of data vectors represents the first key digital picture frame. In this embodiment, it is required that the parameter set includes sufficient information related to the path of movement for a graphical object from its position in the first digital picture frame. This is because in the case where a default path of movement is used (namely, a straight line path from the position of the graphical object in the first digital picture frame), the end point of the path of movement may not be determined without further information.

The last step mentioned in FIG. 1 under the Coding category 103 which may be carried out in coding is to further compress the binary file generated.

Under the Decoding category 105, the first step mentioned in FIG. 1 which may be carried out in decoding is to automatically generate the non-key digital picture frames (i.e., the inbetween frames) based on the sets of data vectors and the parameter set in the graphics file received. The method of generating the non-key digital picture frames will be discussed in more detail in relation to FIG. 2 later.

The second step mentioned in FIG. 1 under the Decoding category 105 which may be carried out in decoding is the optional step to modify some parameters in the parameter set and then automatically regenerate the non-key digital picture frames in view of the modifications made.

This optional step provides a user the ease and flexibility of viewing the graphics according to his preferences. For example, the user may want to have a close up view on the graphics—he only needs to change the camera parameters, namely, the camera close up zooming effect parameter, for example, in order to do this.

Under the Output category 107, the first step mentioned in FIG. 1 which may be carried out in output is to allow the user to modify display related settings, such as the resolution of the digital picture frames, the frame rate, and the graphics output format, for example.

The second step mentioned in FIG. 1 under the Output category 107 which may be carried out in output is the optional step to render the entire graphics (or graphics animation) based on the graphics file received. This step includes automatically coloring the digital picture frames (both key and non-key), and incorporating the audio soundtrack.

As a side note, if layering is used, this second step also automatically recombines the graphical object or the group of graphical objects separated into more than one layer accordingly into a digital picture frame.

The third step mentioned in FIG. 1 under the Output category 107 which may be carried out in output is to either output the graphics rendered into a displayable graphics file on the user's device or display the graphics on the display screen of the user's device, according to the user's preferences.

As a side remark, it can be seen that in this embodiment of the invention, in order to produce an animation clip (which consists of a sequence of digital picture frames), for example, a graphics artist only needs to manually "draw" a number of key digital picture frames and then let the computer (with the an application program capable of performing the functions/steps of this embodiment of the invention) automatically generate the remaining non-key digital picture frames. In other words, the graphics artist no longer needs to manually "draw" every digital picture frame in the animation clip.

Figure 2:
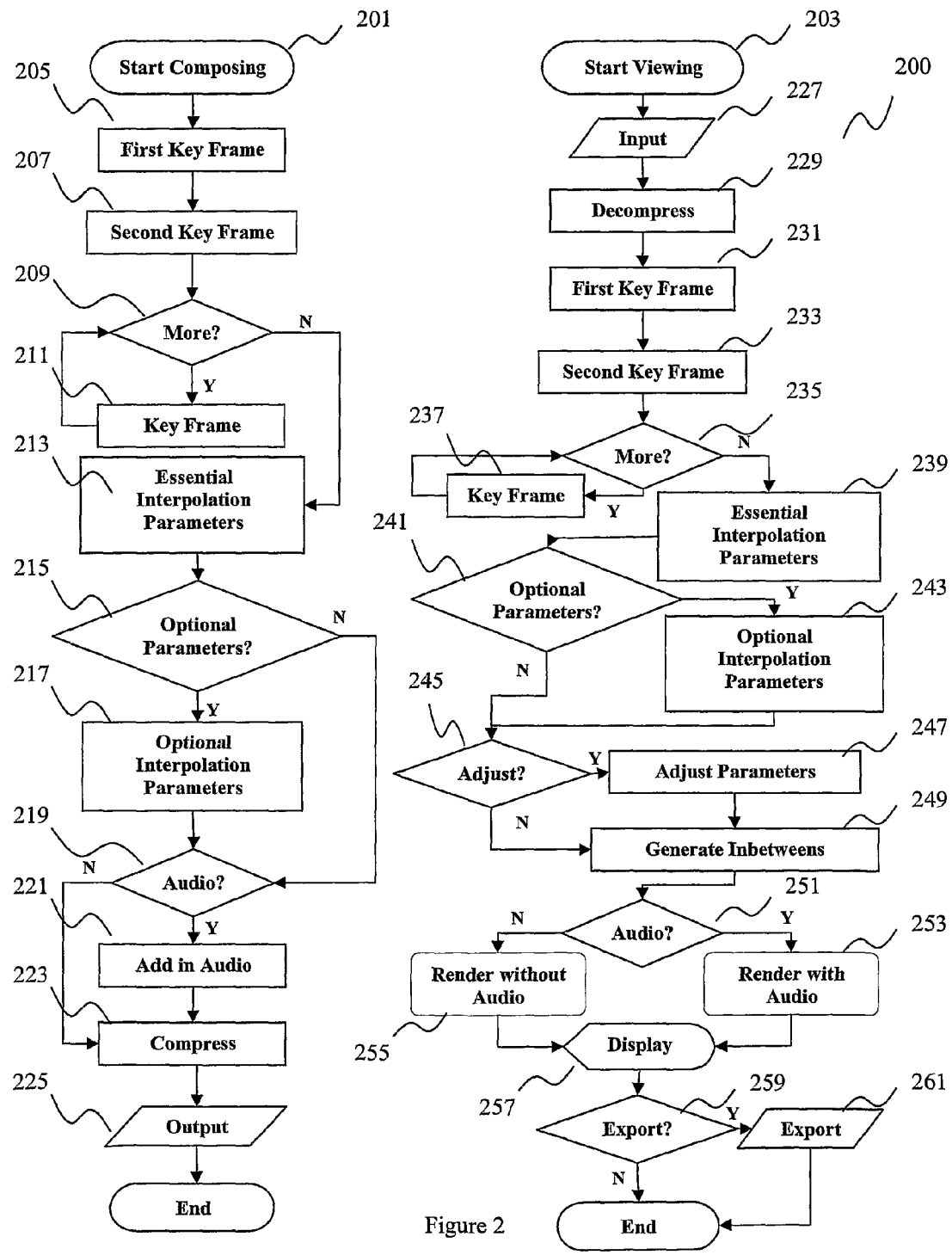
FIG. 2 shows a flow diagram describing in detail the steps of generating graphics data and displaying graphics data according to an embodiment of the invention.

FIG. 2 shows a flow diagram 200 describing in detail the steps of generating graphics data and displaying graphics data according to an embodiment of the invention.

The flow diagram 200 consists of two sub-diagrams, a first sub-diagram 201 illustrating a method of generating (or providing) graphics data, and a second sub-diagram 203 illustrating a method of displaying graphics data.

In the method of generating graphics data, the first key digital picture frame and the second key digital picture frame are generated, vectorized and then stored into the graphics file in steps 205 and 207 respectively. In this regard, during the process of vectorization, each key digital picture frame is represented as a set of data vectors If it is determined that more key digital picture frames are required in step 209, more key digital picture frames are generated, vectorized and stored into the graphics file (in step 211).

Once it is determined that no more key digital picture frames are required in step 209, the processing proceeds to step 213, where the essential interpolation parameters are added to the graphics file. The essential interpolation parameters form part of the parameter set mentioned earlier. In this regard, an example of the essential interpolation parameters may be the number of digital picture frames to be generated along the path of movement.

If it is determined in step 215 that optional interpolation parameters are required, the processing proceeds to step 217, where the optional interpolation parameters are added to the graphics file. The optional interpolation parameters also form part of the parameter set mentioned earlier. Next, the processing proceeds to step 219.

If it is determined that no optional interpolation parameters are required in step 215, the processing proceeds directly to step 219.

In step 219, if it is determined that audio data should be incorporated into the graphics file, audio data is then added into the graphics file (in step 221). The processing then proceeds to step 223.

If it is determined that audio data should not be incorporated into the graphics file in step 219, the processing then proceeds directly to step 223.

In step 223, the graphics file may be further compressed in order to reduce the size of the resultant output graphics file. In this regard, it should be noted that step 223 is an optional step.

Next, the compressed graphics file is output in step 225.

In the method of displaying graphics data according to the second sub-diagram 203, the graphics file, which is received as an input in steps 227, is first decompressed in step 229, if it is determined that compression had been performed during the process of generating the graphics file.

Next, the first key digital picture frame and the second key digital picture frame are reconstructed from the first and second set of data vectors in the graphics file (in steps 231 and 233 respectively).

Following which, if it is determined that there are more sets of data vectors in the graphics file (in step 235), further key digital picture frames are reconstructed accordingly in step 237.

If it is determined that there are no more sets of data vectors in the graphics file (in step 235), which means that there are no more key digital picture frames, the processing proceeds to step 239, where the essential interpolation parameters, which is stored as part of the parameter set, are read in from the graphics file.

Next, if it is determined that there are optional interpolation parameters in the graphics file (in step 241), the optional interpolation parameters are read in from the graphics file, in step 243. The processing then proceeds to step 245.

If it is determined that there are no more optional interpolation parameters in the graphics file (in step 241), the processing then proceeds directly to step 245.

In step 245, if it is determined that there are adjustments made by the user, for example, the adjustment parameters are read in step 247. The processing then proceeds to step 249.

If it is determined in step 245 that there are no adjustments made by the user, for example, the processing then proceeds directly to step 249.

In step 249, the non-key digital picture frames are reconstructed accordingly, and then inserted accordingly into a proper sequence as determined by the interpolation parameters.

Next, in step 251, if it is determined that there is audio-related information in the graphics file, the graphics would be rendered with audio (in step 253). Otherwise, the graphics would be rendered without audio in step 255.

Following which, the graphics rendered is then displayed in step 257.

Next, in step 259, if it is determined that the graphics rendered should be exported to a file, the graphics rendered is then exported to a file in step 261.

In this regard, it is typically desirable that the file, to which the graphics rendered is exported, may be played back without performing the method of displaying graphics data again. Accordingly, the size of this direct playback capable file is larger than the graphics file (from which the graphics is rendered).

Additionally, the larger size of this direct playback capable file is acceptable since it is only stored and subsequently played again on the same device. However, if the graphics is to be transmitted to another device, it may be advantageous to transmit the smaller sized graphics file instead.

Figure 3:
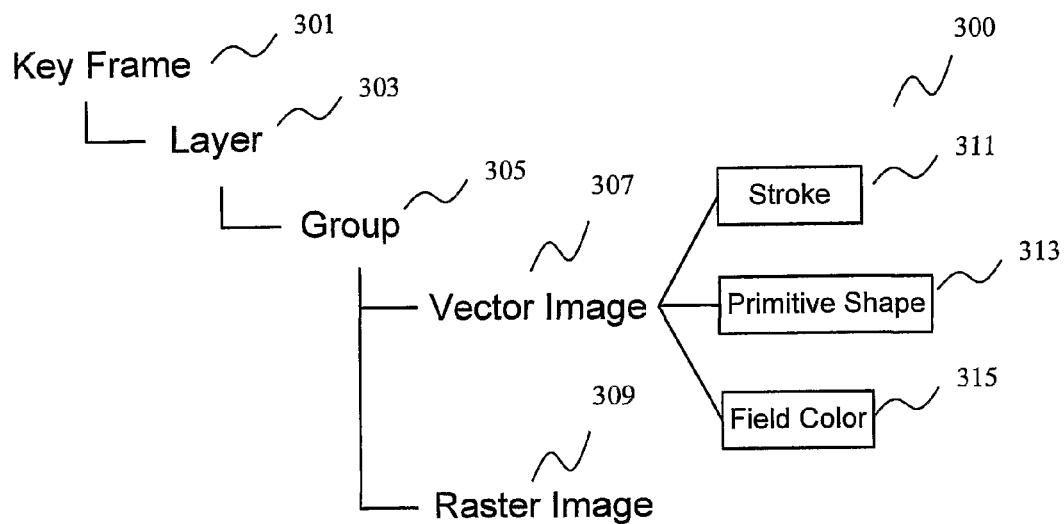
FIG. 3 shows a diagram providing a structural overview of a key digital picture frame in the graphics file according to an embodiment of the invention.

FIG. 3 shows a diagram 300 providing a structural overview of a key digital picture frame in the graphics file according to an embodiment of the invention.

As shown in FIG. 3, a key digital picture frame 301 comprises graphical objects which may be grouped according to the respective layers 303, i.e., each layer 303 is associated with one or more groups 305 of graphical objects.

Each graphical object may be a vector based image 307 or a raster image 309. A graphical object, which is a vector based image 307, may be represented by at least one of the following or a combination thereof: a stroke 309, a primitive shape 311 or a field color 313.

As a side note, an image may be converted from a raster representation to a vector based representation. One advantage for so doing is that the size of the graphics file, containing the image, will be further reduced. Another advantage for so doing is to further improve on the clarity of the image, as illustrated in FIG. 4.

Figure 4:
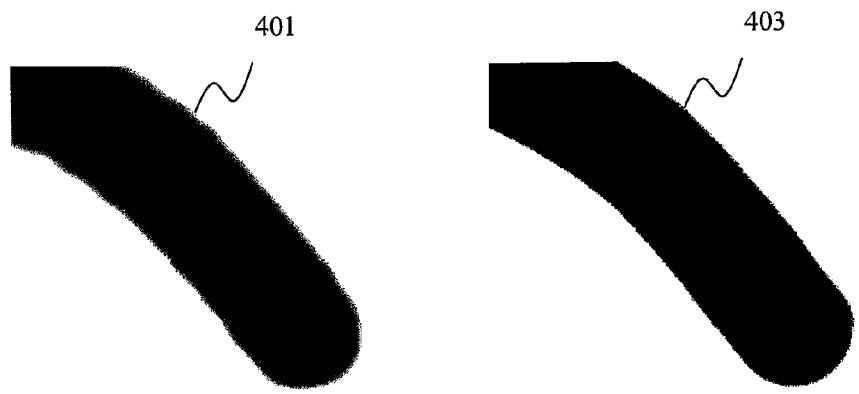
FIG. 4 shows a comparison between an image of a non-vectorized stroke and an image of a vectorized stroke.

FIG. 4 shows a comparison between an image of a non-vectorized stroke 401 and an image of a vectorized stroke 403.

As a side remark, it should be noted that the images shown in FIG. 4, have been magnified by 25 times.

From FIG. 4, it can be seen that the color near the edge of the non-vectorized stroke 401 is not sharp and the edge of the stroke is jagged. But these effects are not seen on the vectorized stroke 403; instead, it can be seen that the edge of the vectorized stroke 403 is rather smooth.

Therefore, as mentioned earlier, the clarity of the image may be improved by converting the image from a raster representation to a vector based representation.

Figure 5:
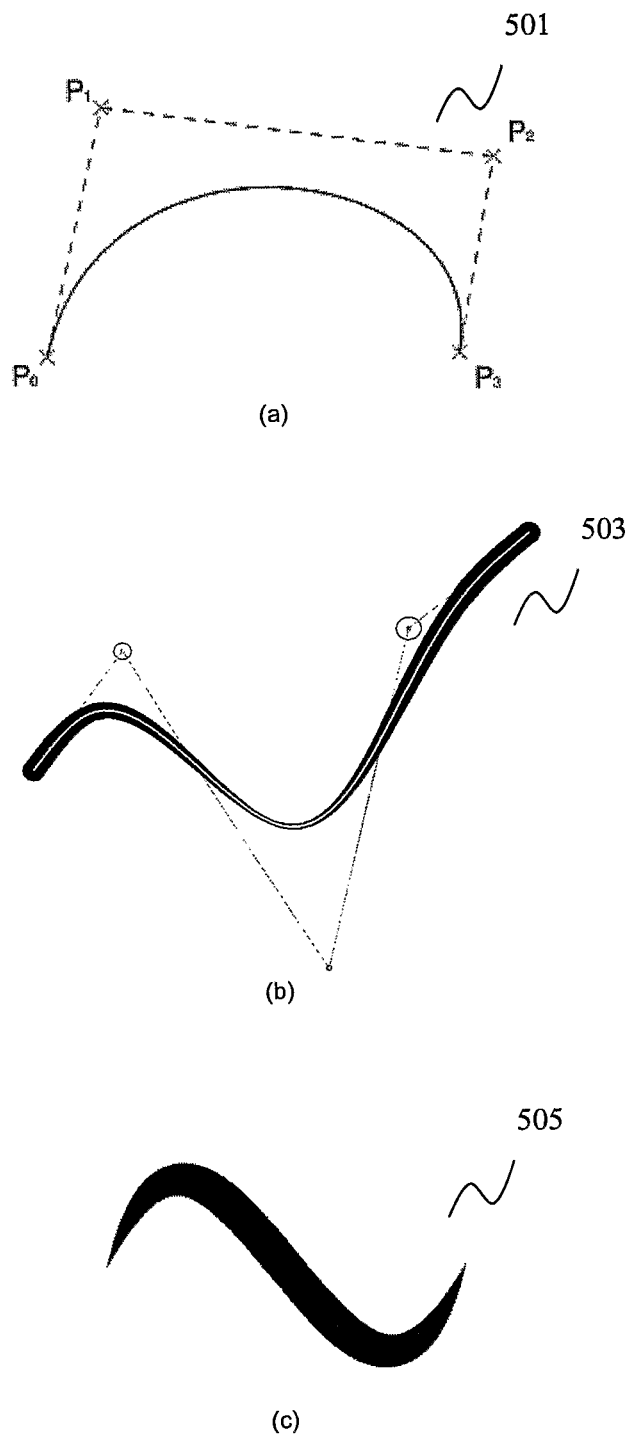
FIG. 5 shows a comparison of three vector based representations.

FIG. 5 shows a comparison of three vector based representations.

The first vector based representation, the Bezier curve, 501, is a widely used conventional vector based representation.

The second vector based representation, the disk B-spline curve (DBSC), 503, is developed as an alternative to the Bezier curve, 501. The DBSC representation was found to provide greater flexibility, especially in representing strokes with uneven width, and in its ability to represent strokes with texture as well [1].

The third vector based representation, the DBSC with color, 505, is an enhanced DBSC representation with the ability to add color features.

In the DBSC representation, a stroke may be represented by at least one control circle, which lies within the stroke itself. Each control circle is denoted by the position of its control (or center) point (which may be represented in as a position coordinate on an X-Y axis in a 2-dimensional image or on an X-Y-Z axis in a 3-dimensional image) and a radius. Also, the addition of a color feature only requires the addition of a color parameter to the existing parameters.

In more detail, the disk B-spine curve (DBSC) is defined as $$\langle D \rangle(t) = \sum_{i=0}^{n} N_{i,p}(t) \langle P_i; r_i \rangle$$

where $P_i$ is the control point and $r_i$ is the control radius. Additionally, $\langle P_i; r_i \rangle$ is a disk in the plane defined as $$\langle P; c \rangle \equiv \{x \in R^2 | |x-c| \leq r, c \in R^2, r \in R^+\}$$

Since $$\langle D \rangle(t) = \sum_{i=0}^{n} N_{i,p}(t) \langle P_i; r_i \rangle$$

$$= \sum_{i=0}^{n} \langle N_{i,p}(t) P_i; N_{i,p}(t) r_i \rangle$$

$$= \left\langle \sum_{i=0}^{n} \left( N_{i,p}(t) P_i; \sum_{i=0}^{n} \langle N_{i,p}(t) r_i \rangle, \right. \right.$$

a disk B-spline curve (DBSC) may be viewed as two parts.

The first part is the center curve, given as $$c(t) = \sum_{i=0}^{n} N_{i,p}(t)P_i,$$

which is a B-spline curve.

The second part is the radius function, given as $$r(t) = \sum_{i=0}^{n} N_{i,p}(t)r_i,$$

which is a B-spline scalar function.

FIG. 6 shows the representation of a stroke in the graphics file format according to an embodiment of the invention.

As shown in FIG. 6, a stroke may be represented by a color parameter, a control point position parameter and a radius parameter. This is in accordance with the DBSC representation with color, described earlier in relation to FIG. 5.

FIG. 7 shows the representation of a primitive shape in the graphics file format according to an embodiment of the invention.

As mentioned in relation to FIG. 3, a graphical object may be represented by at least one of the following or a combination thereof: a stroke, a primitive shape or a field color. A description on the representation of a stroke has been given earlier, in relation to FIG. 6. Here, a description on the representation of a primitive shape is given, as follows.

As shown in FIG. 7, a primitive shape may be represented by a shape type, a color parameter and a set of shape dependent data. Exemplary representations of several known primitive shapes, such as a circle, a rectangle and a polygon, for example, will be discussed in relation to FIG. 8.

FIG. 8 shows exemplary representations of a circle, a rectangle and a polygon as a primitive shape in the graphics file format according to an embodiment of the invention.

As shown in the first table of FIG. 8, a circle may be represented by a center position parameter and a radius parameter. In this regard, the set of shape dependent data for the case of a circle is the center position parameter and the radius parameter.

As shown in the second table of FIG. 8, a rectangle may be represented by a position parameter, a width parameter and a height parameter. In this regard, the set of shape dependent data for the case of a rectangle is a position parameter, a width parameter and a height parameter.

As shown in the third table of FIG. 8, a polygon may be represented by a number of points parameter, and a position parameter for each point of the polygon. In this regard, the set of shape dependent data for the case of a polygon is a number of points parameter, and a position parameter for each point of the polygon.

FIG. 9 shows the representation of a field color in the graphics file format according to an embodiment of the invention.

As mentioned in relation to FIG. 3, a graphical object may be represented by at least one of the following or a combination thereof: a stroke, a primitive shape or a field color. A description on the representation of a stroke and a primitive shape has been given earlier, in relation to FIGS. 6 and 7. Here, a description on the representation of a field color is given, as follows.

As shown in FIG. 9, a field color may be represented by a position parameter and a color parameter. In this regard, the position parameter refers to the coordinates of a point in the digital picture frame, and the color parameter refers to the color of the said point.

As a side note, the representation of the color parameter may take many forms, for example, a flat color (as represented by red-green-blue alpha (RGBA), for example), a gradient color or a texture.

FIG. 10 shows an example of an embodiment of the invention, wherein a set of data vectors is used as a means of modifying the path of movement of the graphical object.

In this illustration, in FIG. 10 (*a*), the default path of movement of a graphical object from its position in the first key digital picture frame 1001 to its position in the second key digital picture frame 1003 is a straight line 1005.

With the addition of a third key digital picture frame 1007, the path of movement of the graphical object is changed in such a way that it now passes through the position of the said graphical object in the third key digital picture frame. As a result, the path of movement of the graphical object appears to be an arc 1009.

As mentioned earlier, the graphical object in each key digital picture frame is represented by a set of data vectors. As such, the graphical object in the third key digital picture frame is also represented by a set of data vectors. Accordingly, as shown in this illustration, the path of movement of the graphical object is modified by a set of data vectors (representing the graphical object in the third key picture frame).

As a side note, the set of data vectors representing the graphical object in the third key digital picture frame may be stored in the parameter set mentioned earlier.

FIG. 11 shows a further example of an embodiment of the invention, wherein a set of data vectors is used as a means of modifying the path of movement of the graphical object.

FIG. 11 (*a*) shows a series of digital picture frames (labeled from 1101 to 1111), wherein digital picture frames 1101, 1106 and 1111 are key frames and the other digital picture frames are the generated non-key frames.

FIG. 11 (*b*) shows the same series of digital picture frames (1101-1111) superimposed on each other, thus showing the "animation" of the movement of the ball.

Using the same terminology as used in FIG. 10, in this case, the first key digital picture frame is 1101, the second key digital picture frame is 1111 and the third key digital picture frame is 1106.

Similar to the embodiment illustrated in FIG. 10, it should be noted that in this embodiment, the default value for the path of movement of the graphical object from its position in the first key digital picture frame to its position in the second key digital picture frame is also a straight line.

By the addition of the third key digital picture frame 1106, the path of movement of the graphical object now passes through the position of the said graphical object in the third key digital picture frame 1106. As a result, the path of movement of the graphical object appears to be an arc 1113, as shown in FIG. 11 (*b*). Accordingly, similar to the illustration of FIG. 10, the path of movement of the graphical object is modified by a set of data vectors (representing the graphical object in the third key picture frame).

Figure 12:
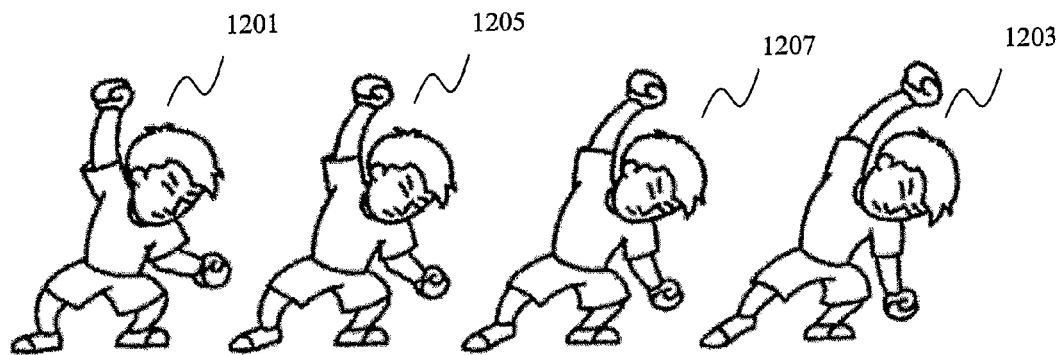
FIG. 12 shows the result of a graphical object in a key digital picture frame obtained from a raster image and then animated according to an embodiment of the invention.

FIG. 12 shows the result of a graphical object in a key digital picture frame obtained from a raster image and then animated according to an embodiment of the invention.

In one embodiment, the graphical object in the first key digital picture frame 1201 may be obtained by converting a raster image to a vector based image. Next, parts of the graphical object are grouped accordingly (into layers, for example). The entire converted graphical object is part of the first key digital picture frame 1201, and the set of data vectors generated for the first key digital picture frame 1201 are stored in a graphics file.

In a similar manner, a set of data vectors may be generated for the second key digital picture frame 1203, and then stored in the graphics file.

After which, several parameters, including the path of movement, may be defined and added into the graphics file, as the parameter set.

During the process of rendering and displaying the graphics, the two non-key digital picture frames are generated. The two non-key digital picture frames are labeled respectively as 1205 and 1207 in FIG. 12.

It can be seen in FIG. 12 that only portions of the graphical object has "moved", for example, the hands and feet, but not the head. This feature may be implemented using the grouping of portions of the graphical object as separate groups, using layering, for example. The implementation of this feature will be discussed in more detail in relation to FIG. 14.

As a side remark, in this embodiment, the raster image is first converted into a vector based image. However, this may not be always the case, as shown in the embodiment which will be discussed subsequently.

In another embodiment, only parts of the raster image are "converted" into vector data, or "vectorized". In more detail, only the outline of a graphical object may be converted into vector data.

For example, the shirt worn by the person in FIG. 12 is used for the purpose of this illustration. With regard to this shirt, the outline of the shirt may be converted into vector data, while the other parameters describing the shirt (for example, the color, etc.) may be considered as texture information or color information, which are non-vector data. It should be noted that the example described in this illustration may also be applied to other graphical objects in FIG. 12.

Accordingly, the vector data and other (non-vector) data obtained from the key digital picture frames 1201 and 1203, may be stored as a graphics file. Further, additional parameters such as the path of movement of the graphical object, may be defined by the user and subsequently stored in the graphics file.

Following which, during the process of rendering and displaying the graphics file, the intermediate digital picture frames 1205 and 1207 may then be generated according to the embodiments of the present invention.

Figure 13:
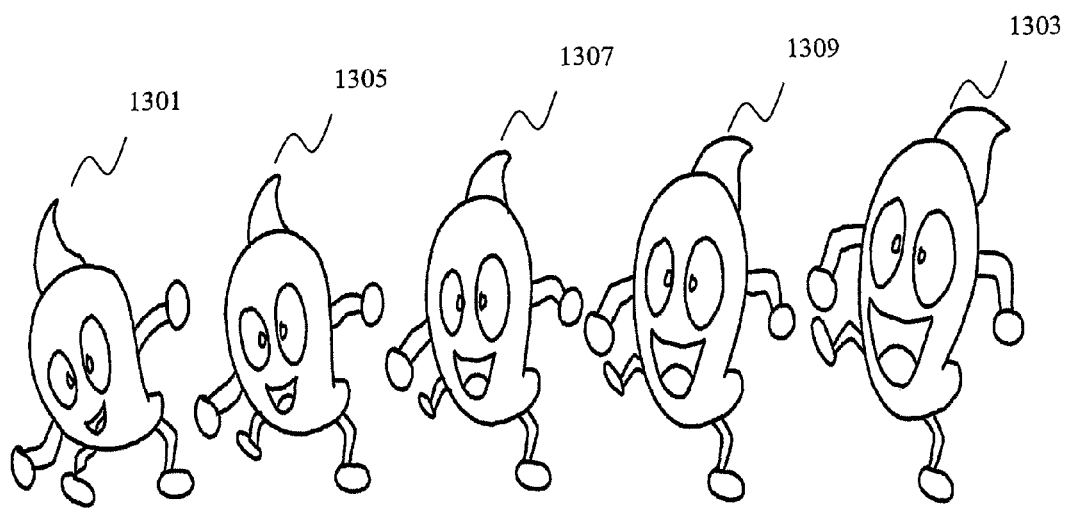
FIG. 13 shows an example of animating a graphical object according to an embodiment of the invention.

FIG. 13 shows an example of animating a graphical object, according to an embodiment of the invention.

In this example, the first key digital picture frame 1301 and the second key digital picture frame 1303 are provided, and the 3 non-key digital picture frames (labeled respectively as 1305, 1307 and 1309) are generated.

Similar to the example shown in FIG. 12, it can be seen that some portions of the graphical object are "moved" differently from other portions of the graphical object, for example, the hands, the feet, and the head. As mentioned earlier, this feature may be implemented using the grouping of portions of the graphical object as separate groups, using layering, for example. The implementation of this feature will be discussed in detail in relation to FIG. 14.

FIG. 14 shows an example of animating a graphical object using layering, according to an embodiment of the invention.

In this illustration, there are 2 key digital picture frames (key digital picture frame 1 1401 and key digital picture frame 2 1403) and 3 generated non-key digital picture frames (labeled respectively as 1405, 1407 and 1409).

In each digital picture frame, parts of the graphical object are grouped into different layers. The right side limbs (hand and leg) are grouped into layer 1, the head in layer 2, the body in layer 3, and the left side limbs (hand and leg) are grouped into layer 4.

It can be seen that the path of movement for the part of the graphical object in each layer is different from those in other layers. As shown in this illustration, by so doing, layering may also be used as a means of animating a complex graphical object or animating a graphical object performing complex actions.

As a side note, in order to obtain a realistic animation, the areas which are normally hidden from view, are also removed, as shown at the bottom of FIG. 14. Additionally, it should be noted that the step of removing areas which are normally hidden from view may be performed automatically.

Figure 15:
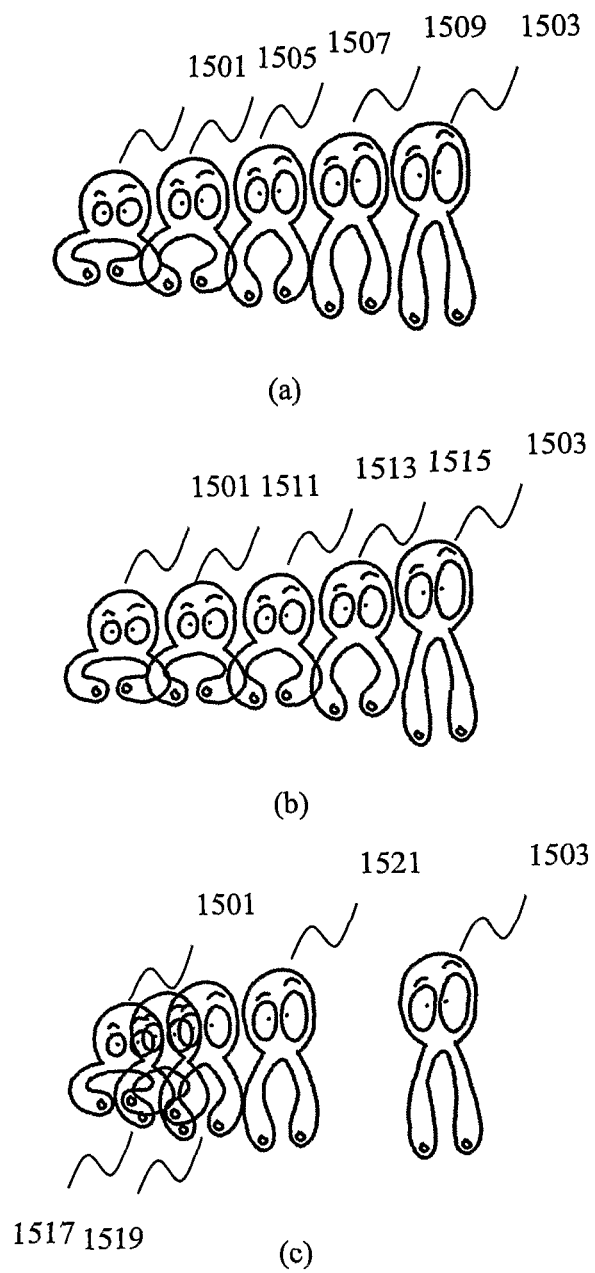
FIG. 15 shows an example of the effects of modifying the parameter set on the animation of a graphical object according to an embodiment of the invention.

FIG. 15 shows an example of the effects of modifying the parameter set on the animation of a graphical object, according to an embodiment of the invention.

In the illustrations shown in FIG. 15, there are only two key digital picture frames, which are labeled as 1501 and 1503 respectively. The other digital picture frames are non-key, and hence, are all generated. As such, in each illustration of FIGS. 15 (*a*), 15 (*b*) and 15 (*c*), there are only 3 non-key digital picture frames generated. The generated non-key digital picture frames are arranged accordingly in a sequence between the first key digital picture frame 1501 and the second key digital picture frame 1503.

FIG. 15 (*a*) shows the sequence of digital picture frames, wherein the non-key digital pictures frames are generated using the default values for the speed of shape changing and the speed of position changing parameters of the graphical object.

In this illustration, it can be seen that the changes in the graphical object from one digital picture frame to another (in the sequence from 1501, 1505, 1507, 1509 and 1503) are gradual and looks natural.

FIG. 15 (*b*) shows the sequence of digital picture frames, wherein the non-key digital pictures frames are generated using the default value for the speed of position changing parameter of the graphical object, but with a defined value for the speed of shape changing parameter of the graphical object.

In this illustration, it can be seen that the changes in the graphical object from one digital picture frame to another (in the sequence from 1501, 1511, 1513 and 1515) are gradual, and look natural. However, the change in the graphical object from digital picture frame 1515 to digital picture frame 1503 is rather abrupt.

This is because the speed of shape changing parameter has been set to a value which is slower than the default value. As a result, the shape of the object graphical is changed slowly in the generated non-key digital picture frames. Accordingly, the shape difference between the non-key digital picture frame immediately before the second key digital picture frame (1515) and the second key digital picture frame (1503) itself is relatively large, as compared to the shape difference between any two adjacent digital picture frames in the sequence.

FIG. 15 (*c*) shows the sequence of digital picture frames, wherein the non-key digital pictures frames are generated using the default value for the speed of shape changing parameter of the graphical object, but with a defined value for the speed of position changing parameter of the graphical object.

In this illustration, it can be seen that the position difference between the graphical object in one digital picture frame to the graphical object in an adjacent digital picture frame (in the sequence from 1501, 1517, 1519 and 1521) are relatively equal. However, the position difference between the graphical object in digital picture frame 1521 and the graphical object in digital picture frame 1503 is relatively large.

This is because the speed of position changing parameter has been set to a value which is slower than the default value. As a result, the position of the object graphical is changed slowly in the generated non-key digital picture frames. Accordingly, the position difference between the graphical object in the non-key digital picture frame immediately before the second key digital picture frame (1521) and the graphical object in the second key digital picture frame (1503) itself is relatively large, as compared to the position difference between the graphical objects in any two adjacent digital picture frames in the sequence.

FIG. 16 shows another example of the effects of modifying the parameter set on the animation of a graphical object, according to an embodiment of the invention.

In the illustrations shown in FIG. 16, there are only two key digital picture frames, which are labeled as 1601 and 1603 respectively. The other digital picture frames are non-key, and hence, are all generated. Accordingly, in each illustration of FIGS. 16 (*a*) and 16 (*b*), there are only 3 non-key digital picture frames generated. Additionally, the generated non-key digital picture frames are arranged accordingly in a sequence between the first key digital picture frame 1601 and the second key digital picture frame 1603.

FIG. 16 (*a*) shows the sequence of digital picture frames, wherein the non-key digital pictures frames are generated using the default value for the parameter on the direction parameter of the graphical object along the path of movement.

In this illustration, it can be seen that the direction of the graphical object from one digital picture frame to another (in the sequence from 1601, 1605, 1607, 1609 and 1603) is fixed (always pointing roughly towards the northeastern direction).

FIG. 16 (*b*) shows the sequence of digital picture frames, wherein the non-key digital pictures frames are generated using a defined value for the parameter on the direction parameter of the graphical object along the path of movement.

In this illustration, it can be seen that the direction of the graphical object from one digital picture frame to another (in the sequence from 1601, 1611, 1613, 1615 and 1603) follows the path of movement (and not always pointing towards the northeastern direction, as in the case using the default value).

Figure 17:
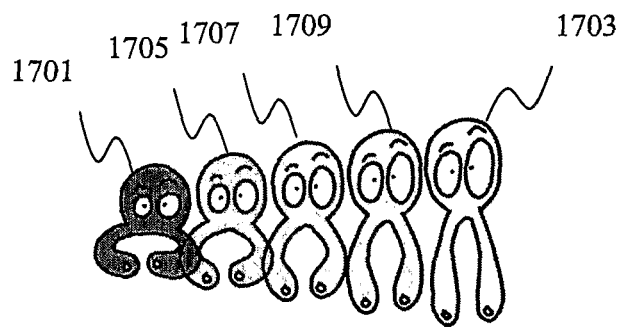
FIG. 17 shows yet another example of the effects of modifying the parameter set on the animation of a graphical object according to an embodiment of the invention.

FIG. 17 shows yet another example of the effects of modifying the parameter set on the animation of a graphical object, according to an embodiment of the invention.

In the illustration shown in FIG. 17, there are only two key digital picture frames, which are labeled as 1701 and 1703 respectively. The other 3 digital picture frames are non-key, and hence, are all generated. The generated non-key digital picture frames are arranged accordingly in a sequence between the first key digital picture frame 1701 and the second key digital picture frame 1703 (and are labeled respectively as 1705, 1707 and 1709 respectively).

In this illustration, it can be seen that the color of the graphical object from one digital picture frame to another (in the sequence from 1601, 1605, 1607, 1609 and 1603) is changed gradually from a darker color to a lighter one. This effect is achieved by using the color of the graphical object parameter described earlier.

Figure 18:
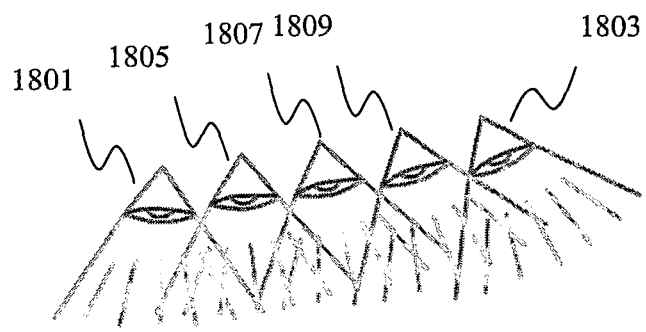
FIG. 18 shows a further example of the effects of modifying the parameter set on the animation of a graphical object according to an embodiment of the invention.

FIG. 18 shows a further example of the effects of modifying the parameter set on the animation of a graphical object, according to an embodiment of the invention.

In this illustration, the graphical object is a light source. As such, since the light source is moving, the lighting effects from one digital picture frame to another (in the sequence from 1801, 1805, 1807, 1809 and 1803) are different. Such lighting effects may be achieved by using the lighting effects parameter described earlier.

Figure 19:
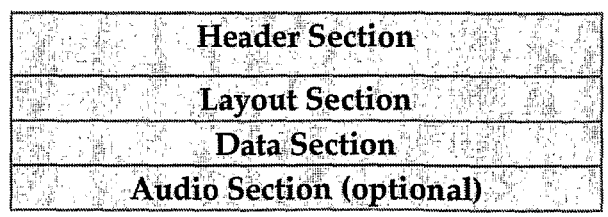
FIG. 19 shows an overview of the representation of audio data in the graphics file format according to an embodiment of the invention.

FIG. 19 shows an overview of the representation of audio data in the graphics file format according to an embodiment of the invention.

As mentioned earlier, the incorporating of audio data into the graphics file format is optional. Since optional information is stored at the end of a typical file format), the information on the optional Audio Section data is stored at the end of the graphics file as shown in FIG. 19.

As also mentioned earlier, there are two methods of incorporating audio data into the graphics file. The first method is to store the audio data directly in the graphics file. This method will be discussed in more detail in relation to FIGS. 20 and 21.

The second method is to store the audio data in an audio library, for example, and to store an index to the audio data in the graphics file. The audio data may then be accessed using the index stored in the graphics file. As such, in this second method, since only the index to the audio data is stored on the graphics file (and not the audio data itself), it is therefore possible to obtain a graphics file with a smaller file size as compared to the first method, for example. This second method will be discussed in more detail in relation to FIG. 22.

FIG. 20 shows a method of representing audio data in the graphics file format according to an embodiment of the invention.

In this illustration, the audio data is grouped according to audio channels. Each audio channel data includes an Audio Channel Identifier (ID), a data size parameter and audio clips data.

In this regard, the Audio Channel Identifier (ID) is used to refer to a specific audio channel. The data size parameter contains information on the size of all audio clips in the corresponding audio channel.

Further, the representation of the audio clip data will be discussed in more detail in relation to FIG. 21.

FIG. 21 shows a method of representing audio clip data in the graphics file format according to an embodiment of the invention.

In this illustration, each audio clip data includes an Audio Clip Identifier (ID), an Audio Clip Size parameter, an Audio Starting Time parameter, an Audio Ending Time parameter, audio clip data and an optional Audio Effect data.

In this regard, the Audio Channel Identifier (ID) is used to refer to a specific audio clip. The Audio Clip Size parameter contains information on the size of the audio clip data. The Audio Starting Time and Audio Ending Time parameters are used to indicate the respective start and end times of playing the audio clip.

The optional Audio Effect data includes an Audio Effect Identifier (ID) and a corresponding set of Audio Effect parameters.

FIG. 22 shows the representation of an index to an audio data library in the graphics file format according to an embodiment of the invention.

According to the second method of incorporating audio data in the graphics file using an index to an audio clip stored in an audio library, using the representation of the audio clip data in FIG. 21, the index to the audio clip may be represented as shown in FIG. 22.

In this illustration, the index to the audio clip includes an Audio Clip Type parameter, an Audio Library Identifier (ID) and an Audio Clip Identifier (ID). In this regard, the Audio Clip Type parameter is used to indicate whether the audio clip referred to is stored in the graphics file or in an audio library.

For the case when the audio clip referred to is stored in an audio library, the Audio Library Identifier (ID) is used as the reference to the specific audio library. The Audio Clip Identifier (ID) is then used as the reference to the specific audio clip.

Embodiments of the invention have the following advantages.

Firstly, the size of the graphic files may be reduced using the embodiments of the invention. As such, due to its small size, the graphics files generated using the embodiments of the present invention are suitable for transmissions across bandwidth limited channels, for example.

Secondly, the graphic files obtained using the embodiments of the invention further provide the end user with ease and flexibility in setting up the environment of how he wishes to view the graphics.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In this document, the following publication is cited:
[1] Seah, H. S. et al., "Artistic Brushstroke Representation and Animation with Disk B-Spline Curve", Proceedings of ACE 2005, Valencia, Spain, June 2005.

What is claimed is:

1. A method of providing graphics data, comprising:
    generating a first set of data vectors specifying geometrical characteristics of a graphical object in a first digital picture, the first set of data vectors representing a first key digital picture frame,
    generating a second set of data vectors specifying geometrical characteristics of the graphical object in a second digital picture to be displayed after the first digital picture, the second set of data vectors representing a second key digital picture frame,
    generating a parameter set comprising information specifying intermediate geometrical characteristics of the graphical object based on the geometrical characteristics of the graphical object in the first digital picture and based on the geometrical characteristics of the graphical object in the second digital picture, wherein the intermediate geometrical characteristics are geometrical characteristics of the graphical object in at least one third digital picture which is to be displayed after the first digital picture and before the second digital picture,
    generating at least one data file comprising the first set of data vectors, the second set of data vectors and the parameter set, and
    using predetermined definitions stored in a library file as vector information to represent the graphical object in the first key digital picture frame and the second key digital picture frame in order to reduce the size of the at least one data file; and
    wherein the predetermined definitions include an enhanced disk B-spline curve represented by at least one control circle, the control circle denoted by a position of a control point, a radius and a color parameter.

2. The method of claim 1, further comprising
    generating a first set of data vectors specifying geometrical characteristics of a plurality of graphical objects in the first digital picture, and
    generating a second set of data vectors specifying geometrical characteristics of a plurality of graphical objects in the second digital picture to be displayed after the first digital picture.

3. The method of claim 1, the parameter set further comprising
    information on the path of movement from the position of the graphical object in the first digital picture to the position of the graphical object in the second digital picture.

4. The method of claim 3, wherein the parameter set further comprising
    information on the direction of the graphical object along the path of movement from its position in the first digital picture to its position in the second digital picture.

5. The method of claim 3, wherein the parameter set further comprising
    information on lighting effects.

6. The method of claim 5, wherein the parameter set further comprising
    information on lighting effects, when the graphical object is a light source.

7. The method of claim 1, wherein the parameter set further comprising
    a third set of data vectors specifying geometrical characteristics of the graphical object in a fourth digital picture which is to be displayed after the first digital picture and before the second digital picture.

8. The method of claim 1, wherein the parameter set further comprising
    information on a number of third digital pictures which is to be displayed after the first digital picture and before the second digital picture.

9. The method of claim 8, wherein the parameter set further comprising
    information on the shape of the graphical object in the first digital picture, the second digital picture and/or the at least one third digital picture.

10. The method of claim 9, wherein the information on the shape of the graphical object in the first digital picture, the second digital picture and/or the at least one third digital picture, further comprising
    information on a speed at which the shape of the graphical object changes from the first digital picture to the second digital picture.

11. The method of claim 8, wherein the parameter set further comprising
    information on a speed at which the position of the graphical object changes from the first digital picture to the second digital picture.

12. The method of claim 1, wherein the parameter set further comprising
    information on camera parameters, such as camera movement path, camera rotation, camera angle and camera close up zooming effect.

13. The method of claim 1, wherein the parameter set further comprising
    information on a layering of graphical objects, wherein the layering of graphical objects determines the order of appearance of the graphical objects.

14. The method of claim 1, wherein the parameter set further comprising
information on color of the graphical object and/or regions in the first digital picture, the second digital picture and/or the third digital picture.

15. The method of claim 1, wherein the parameter set further comprising
information on transparency of the graphical object in the first digital picture, the second digital picture and/or the third digital picture.

16. The method of claim 1, wherein the at least one data file is a binary file.

17. The method of claim 1, further comprising
integrating audio data with the graphics data.

18. The method of claim 17, wherein the at least one data file contains audio data.

19. The method of claim 17, wherein the parameter set further comprising an index to an audio data file.

20. The method of claim 1, further comprising
applying compression techniques on the at least one data file in order to reduce the size of the at least one data file.

21. A method of displaying graphics data, comprising:
receiving a first set of data vectors specifying geometrical characteristics of a graphical object in a first digital picture, the first set of data vectors representing a first key digital picture frame,
receiving a second set of data vectors specifying geometrical characteristics of the graphical object in a second digital picture to be displayed after the first digital picture, the second set of data vectors representing a second key digital picture frame,
receiving a parameter set comprising information specifying intermediate geometrical characteristics of the graphical object based on the geometrical characteristics of the graphical object in the first digital picture and based on the geometrical characteristics of the graphical object in the second digital picture, wherein the intermediate geometrical characteristics are geometrical characteristics of the graphical object in at least one third digital picture which is to be displayed after the first digital picture and before the second digital picture,
generating the first digital picture from the first set of data vectors,
generating the second digital picture from the second set of data vectors, and
generating the at least one third digital picture using the parameter set, the geometrical characteristics of the graphical object in the first digital picture and the geometrical characteristics of the graphical object in the second digital picture;
wherein the graphical object in the first key digital picture frame and the second key digital picture frame is represented by predetermined definitions stored in a library file as vector information in order to reduce the size of the at least one data file, and
wherein the predetermined definitions include an enhanced disk B-spline curve represented by at least one control circle, the control circle denoted by a position of a control point, a radius and a color parameter.

22. The method of claim 21, further comprising
arranging a sequence of digital pictures, wherein the arranged sequence of digital pictures is in the order that the first digital picture is followed by the at least one third digital picture, which is itself followed by the second digital picture.

23. The method of claim 22, further comprising
displaying the arranged sequence of digital pictures.

24. The method of claim 21, further comprising
receiving a first set of data vectors specifying geometrical characteristics of a plurality of graphical objects in the first digital picture, and
receiving a second set of data vectors specifying geometrical characteristics of a plurality of graphical objects in the second digital picture to be displayed after the first digital picture.

25. The method of claim 21, wherein the parameter set further comprising
information on the path of movement from the position of the graphical object in the first digital picture to the position of the graphical object in the second digital picture.

26. A method of providing graphics data, comprising:
generating a first set of data vectors specifying geometrical characteristics of a graphical object in a first digital picture, the first set of data vectors representing a first key digital picture frame,
generating a parameter set comprising information specifying intermediate geometrical characteristics of the graphical object based on the geometrical characteristics of the graphical object in the first digital picture, wherein the intermediate geometrical characteristics are geometrical characteristics of the graphical object in at least one third digital picture which is to be displayed before or after the first digital picture,
generating at least one data file comprising the first set of data vectors and the parameter set, and
using predetermined definitions stored in a library file as vector information to represent the graphical object in the first key digital picture frame in order to reduce the size of the at least one data file; and
wherein the predetermined definitions include an enhanced disk B-spline curve represented by at least one control circle, the control circle denoted by a position of a control point, a radius and a color parameter.

27. A method of displaying graphics data, comprising:
receiving a first set of data vectors specifying geometrical characteristics of a graphical object in a first digital picture, the first set of data vectors representing a first key digital picture frame,
receiving a parameter set comprising information specifying intermediate geometrical characteristics of the object based on the geometrical characteristics of the graphical object in the first digital picture, wherein the intermediate geometrical characteristics are geometrical characteristics of the graphical object in at least one third digital picture which is to be displayed before or after the first digital picture,
generating the first digital picture from the first set of data vectors, and
generating the at least one third digital picture using the parameter set and the geometrical characteristics of the graphical object in the first digital picture; and
wherein the graphical object in the first key digital picture frame is represented by predetermined definitions stored in a library file as vector information in order to reduce the size of the at least one data file, and
wherein the predetermined definitions include an enhanced disk B-spline curve represented by at least one control circle, the control circle denoted by a position of a control point, a radius and a color parameter.

28. The method of claim 27, further comprising
arranging a sequence of digital pictures, wherein the arranged sequence of digital pictures is in the order that the first digital picture is followed by the at least one third digital picture or that first digital picture follows the at least one third digital picture.

29. The method of claim 28, further comprising
displaying the arranged sequence of digital pictures.

* * * * *

UNITED STATES PATENT AND TRADEMARK OFFICE
CERTIFICATE OF CORRECTION

PATENT NO. : 9,064,350 B2
APPLICATION NO. : 12/669382
DATED : June 23, 2015
INVENTOR(S) : Hock Soon Seah et al.

It is certified that error appears in the above-identified patent and that said Letters Patent is hereby corrected as shown below:

On Title page Item (54) and in the Specification in the title,

Change "METHODS OF PROVIDING GRAPHICS DATA AND DISPLAYING" to
--METHODS OF PROVIDING GRAPHICS DATA AND DISPLAYING GRAPHICS DATA--.

Signed and Sealed this
Ninth Day of February, 2016

Michelle K. Lee
*Director of the United States Patent and Trademark Office*